United States Patent
Mukherjee et al.

(10) Patent No.: US 9,226,329 B2
(45) Date of Patent: Dec. 29, 2015

(54) METHOD AND APPARATUS FOR CONTENTION FREE DEVICE SIGNALING WITHOUT A CONTROLLING NETWORK NODE

(71) Applicant: Research In Motion Limited, Waterloo (CA)

(72) Inventors: Biswaroop Mukherjee, Stittsville (CA); William Anthony Gage, Stittsville (CA); Robert Novak, Stittsville (CA)

(73) Assignee: BlackBerry Limited, Waterloo, CA (US)

( * ) Notice: Subject to any disclaimer, the term of this patent is extended or adjusted under 35 U.S.C. 154(b) by 261 days.

(21) Appl. No.: 13/888,944

(22) Filed: May 7, 2013

(65) Prior Publication Data

US 2014/0334456 A1    Nov. 13, 2014

(51) Int. Cl.
H04W 4/00      (2009.01)
H04W 76/02     (2009.01)
H04W 74/00     (2009.01)
H04W 4/22      (2009.01)
H04W 74/02     (2009.01)

(52) U.S. Cl.
CPC .............. *H04W 76/023* (2013.01); *H04W 4/22* (2013.01); *H04W 74/002* (2013.01); *H04W 74/02* (2013.01)

(58) Field of Classification Search
CPC .... H04W 76/023; H04W 4/22; H04W 74/002
USPC ......... 370/335, 336, 341, 342, 328, 329, 252, 370/253, 254
See application file for complete search history.

(56) References Cited

U.S. PATENT DOCUMENTS

| | | | | |
|---|---|---|---|---|
| 2010/0110981 A1* | 5/2010 | Shao | .................... | H04W 76/023 370/328 |
| 2011/0292854 A1* | 12/2011 | Terry | ...................... | H04L 5/001 370/311 |
| 2013/0148566 A1* | 6/2013 | Doppler et al. | ................ | 370/312 |
| 2013/0308549 A1* | 11/2013 | Madan | .................. | H04W 28/26 370/329 |
| 2013/0322413 A1* | 12/2013 | Pelletier et al. | ................ | 370/336 |
| 2014/0003262 A1* | 1/2014 | He et al. | ......................... | 370/252 |

FOREIGN PATENT DOCUMENTS

| | | |
|---|---|---|
| EP | 2343917 A1 | 7/2011 |
| WO | 2012035367 A1 | 3/2012 |
| WO | 2013002688 A1 | 1/2013 |

OTHER PUBLICATIONS

U.S. Appl. No. 61/653,946, filed on May 31, 2012.*
International Search Report on International Application No. PCT/CA2014/000398, mailed Jul. 17, 2014.

(Continued)

*Primary Examiner* — Chuong T Ho
(74) *Attorney, Agent, or Firm* — Moffat & Co.

(57) ABSTRACT

A method and user equipment operating in or near a network without a central controller, the method receiving a device signal from a second user equipment, the second user equipment being within a contention region of the first user equipment; and utilizing the device signal to determine a transmission opportunity at the first user equipment. Further, disambiguation processes include removing network, new device and bootstrapping ambiguity.

28 Claims, 9 Drawing Sheets

(56) References Cited

OTHER PUBLICATIONS

Luis Alonso, Ramón Agustí and Oriol Salient, "A Near-Optimum MAC Protocol Based on the Distributed Queueing Random Access Protocol (DQRAP) for a CDMA Mobile Communication System", IEEE Journal on Selected Areas in Communications, vol. 18, issue 9, pp. 1701-1718, (Sep. 2000).

Qualcomm Incorporated, "Study on LTE Device to Device Proximity Services", 3GPP, RP-122009, Dec. 2012.

IEEE Computer Society "802.15.4 Wireless Medium Access Control (MAC) and Physical Layer (PHY) Specifications for Low-Rate Wireless Personal Area Networks (LR-WPANs)", 2003.

Mischa Schwartz "Telecommunication Networks", Addison Wesley, 1987, pp. 429-433.

* cited by examiner

METHOD AND APPARATUS FOR CONTENTION FREE DEVICE SIGNALING WITHOUT A CONTROLLING NETWORK NODE

FIELD OF THE DISCLOSURE

The present disclosure relates to wireless device-to-device (D2D) communications, and in particular relates to device-to-device communications without a controlling network infrastructure node.

BACKGROUND

In current wireless network scenarios, a device will typically communicate with a network infrastructure node such as a base station or an access point that the device is being served by, which will then allow communication to other devices served by that same network infrastructure node, or to devices served by other network infrastructure nodes. However, such communication may not be possible in remote areas where wireless network coverage from an infrastructure node does not exist. Further, even where wireless network coverage exists, communications using a network infrastructure node may not be desirable. For example, in general communication systems, a direct D2D transmission of data may provide more efficient space division multiplexing than current networks.

Device-to-device communications are communications between two wireless devices or user equipments (UEs), where the communication proceeds directly between UEs and does not proceed through a network infrastructure node. Uses for D2D communications may be for both emergency and non-emergency situations. For example, first responders and public safety members may use D2D communications to communicate between devices. This may be useful in situations where there is no network coverage, such as remote areas or inside a building. However, even in network coverage areas, in some cases D2D communications are desirable in public safety situations.

In non-emergency situations, friends that are in close proximity to each other may wish to communicate with each other. Other cases include devices such as parking meters talking to mobile wireless devices within range to help a mobile wireless device find a free parking space. Other examples are possible.

The operation of a device without a network infrastructure element however has challenges. These include: identifying what devices the UE can communicate with; when receiving, which devices can the UE expect interference from; when transmitting, which devices can the UE expect to interfere; how can a UE signal other devices; what is the timing that the UE uses to communicate with other devices; which resources can be used by individual D2D transmissions so that the receivers face and the transmitters cause low interference; among other challenges.

BRIEF DESCRIPTION OF THE DRAWINGS

The present disclosure will be better understood with reference to the drawings, in which.

DETAILED DESCRIPTION OF THE DRAWINGS

Figure 1:
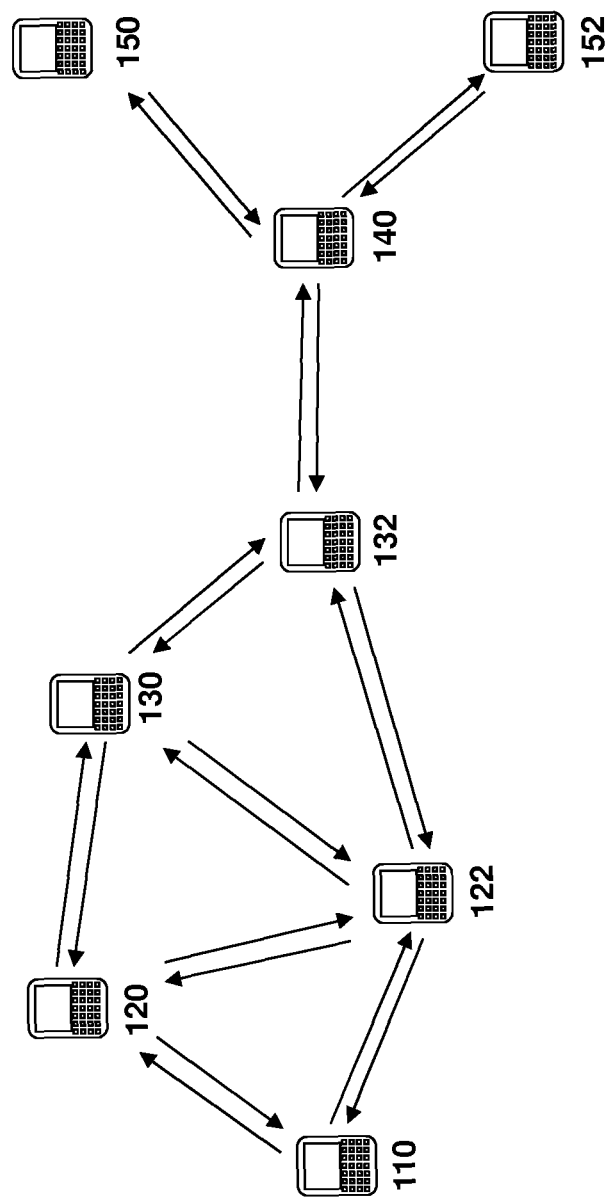
FIG. 1 is a block diagram of an example network comprising user equipments without a central controller.

The present invention provides a method at a first user equipment operating in or near a wireless network without a central controller, the method comprising: receiving a device signal from a second user equipment; and utilizing the device signal to determine a transmission opportunity at the first user equipment.

The present disclosure further provides a first user equipment operating in or near a wireless network without a central controller, the first user equipment comprising: a processor; and a communications subsystem, wherein the first user equipment is configured to: receive a device signal from a second user equipment; and utilize the device signal to determine a transmission opportunity at the first user equipment.

Current $3^{rd}$ Generation Partnership Project (3GPP) networks do not operate without an evolved node B (eNB). Several fundamental problems as described above exist by removing the eNB to allow direct D2D communications.

In particular, a first issue is what devices can a user equipment communicate with. The user equipment will need to know what other devices are within its range of communications in order to be able to communicate with them. When an eNB is present, all devices register with the eNB before they are permitted to send any data. As such, the eNB is able to assign temporary identifiers, including a cell radio network temporary identifier (C-RNTI) that is unique within a cell. However, C-RNTI's are not globally unique in the long term evolution (LTE) architecture of the $3^{rd}$ Generation Partnership Project. Further, such identifiers may not be unique in other network scenarios.

The identifiers are not universally unique in order to allow for signals carrying the identifiers to be efficient and use minimal resources to establish uniqueness of the devices. In particular, a globally unique identifier would require a significant number of bits, which would make signal transmissions inefficient. The function of assigning a radio network temporary identifier or its equivalent becomes an issue once the eNB is removed.

Further, with regard to collisions, collisions are transmissions that are not separable in terms of time, frequency and code at the receiver. In a system where all resources are allocated by an eNB, avoiding collisions is straightforward. For example, in the uplink, based on UE resource requests, UEs are provided resources with a time, frequency and code that are separated from other UEs at the eNB.

However, in order to avoid collisions when there is no eNB, the resource requests may need to involve several devices in the contention area and grants may need to be coordinated. In order to achieve this, the present disclosure provides a set of affected devices that must be identified and signaled. In particular, ambiguity in the identity in the set may cause collisions of signals and data. Collisions of signals and data are undesirable in applications such as voice communications for first responders due to the unpredictability of retransmissions that they may require.

Further, in systems that have an eNB, devices have resources and opportunities for signaling that are either periodically granted by the eNB or provided as a one-off resource. For example in LTE, reference signal and feedback configurations are provided to UEs such that they use resources that are in different resource elements or have different base sequences or cyclic shifts, where the separation is signaled by the eNB. Without the eNB, the separation of signaling is problematic and the devices each need to solve such separation of signaling. Specifically, signaling without an eNB may be particularly difficult in half-duplex because not only does a device need to avoid collision of the signals, it also needs to ensure that the destination device for the signal is in a state that allows it to receive the signal. The destination of the signal should not be transmitting at the same time or be in a state where the radio frequency hardware is transitioning from a transmission to reception mode or the reception to transmission mode.

Further, in systems with an eNB, the timing reference for both downlink and uplink transmissions is provided by the eNB in the form of downlink synchronization sequences and uplink timing adjustment commands. The timing reference is thus uniform across the coverage area of an eNB. In other words, each transmitter and receiver has exactly one timing reference. Without an eNB, achieving timing coordination in devices becomes a significant issue. The choosing of a timing reference from one device as a primary timing source has a drawback in that there is a single point of failure in the system. A more robust solution that is not dependent on only one device, but provides a consistent timing interface for the device to device interaction is provided in accordance with the embodiments below.

Existing D2D systems that do not have an eNB utilize contention based models in which UEs transmit at various times. Such transmission may or may not fall into contention with the transmission of other UEs. Contention in the form of collisions leads to the requirement to resend data. The more devices that are added to a system, the higher the likelihood of collisions. Thus, such contention based models provide poor latency and utilization performance.

While the present disclosure is described with regard to the $3^{rd}$ Generation Partnership Project LTE architecture, this is not meant to be limiting and is only used as an example. Other systems and architectures in which devices can communicate among each other could be used and the present disclosure is not limited to any particular network system.

In accordance with one embodiment of the present disclosure a contention-free solution is provided in which UEs move into such contention-free signaling as quickly as possible without the use of any controller. This results in low latency and higher utilization of resources, without issues relating to network coverage that would exist with a controller based solution.

In order to provide contention-free resources, the identity of nodes in the contention region needs to be unambiguously established. If there is an ambiguity in the identity of devices that may contend for the same communication resources, then there is no way for the system to assign resources to them in a way that will consistently avoid collisions. Thus, in accordance with the embodiments described below, the system provides distributed methods to unambiguously identify devices that may contend by creating unambiguous neighbor sets in each device. As defined below, a device "A" is the neighbor of another device "B" if the device "B" can directly communicate with device "A".

If unique identities are established for devices that contend for resources for example in a set I, then contention free and efficient allocation of resources, represented by a set R, for signaling can be any injective function that maps the identities to resources: $f: I \rightarrow R$.

In accordance with the embodiments below, the system uses an up-to-date set of neighbor devices, referred to as the neighbor set, to eliminate contention on resources by performing distributed allocation of resources for signaling to the neighboring devices. A set of devices that share at least one common neighbor, or neighbor of a neighbor, and so on, form a network. There may be several unconnected networks within a system.

Device Signals

The determination of the identity of neighbors and the establishment of contention free signaling with the neighbor set is accomplished in the present disclosure by device signals (DS) that are transmitted by all the devices in the system. Due to the absence of an eNB, there is no entity in the network that can provide system wide timing or unambiguous identity. The DS, which may be decoded without requiring prior synchronization, is used to establish the identity of the transmitting device and provides timing references for it.

DSs act as a building block of the eNB-less D2D system. For example, using DSs, devices can coordinate resources used for transmission in a manner that minimizes interference and maximizes throughput, even under high load scenarios.

In some embodiments, the DS may be considered similar to a primary synchronization signal/secondary synchronization signal (PSS/SSS) used in current LTE systems. Similar to the PSS/SSS, a signal location for a DSs and a set of possible signals is known in the system. Further, similar to PSS/SSS, the device is expected to decode several different DS signals that are not coordinated in time. However, such signals do not collide since they are separated in code to allow unsynchronized UEs to be able to distinctly receive them.

In accordance with the embodiments below, the resource mapping of the center six resource blocks of PSS/SSS could be used with more or less resource elements employed depending upon the system design. However, one of the chief differences between a DS and PSS/SSS is that, unlike receiving DSs of neighboring devices, the eNBs do not need to receive the PSS/SSSs of the neighboring eNBs. It is the UEs that receive the PSS/SSS signals and report measurements to the eNBs in current LTE systems that provide the eNB with information.

The proposed systems may employ similar resource configurations to PSS/SSS. In particular, PSS/SSS use the center 62 resource elements (REs) around the direct current (DC) subcarrier for PSS and another 62 REs for SSS, all in the center system 6 resource blocks (RBs). DS could use these same resources to allow the support of a DS identifier (DSID) space of $(3*168)=504$ maximum direct neighbors, which is analogous to the 504 physical cell identifiers available in the cellular LTE system. The system may be dimensioned differently to account for different numbers of expected neighbors depending upon the application and thus accordingly use more or less of the 1008 REs available to the center 6 RBs. In some embodiments, different sequences and sequence lengths are available as well as different resources that may be used.

Based on the above, the present device signal is used to unambiguously represent the nominal transmission of each device in the system. The nominal transmission, represented in a DS, defines the communication and interference range of the device. The DS allows a receiving device to identify the transmitting device unambiguously. During a preconfigured period, at least one copy of the DS is sent and received in a contention free manner by each neighbor. The DS is a broadcast signal and as such, several neighboring devices may rely on the same transmission of the DS. Indeed, exactly one DS transmission per device is sufficient for full duplex devices.

For half-duplex devices more than one transmission may be needed to address multiple subsets of devices that may have different send and receive timings. In accordance with the present disclosure mechanisms are provided that may be used by either full duplex or non-full duplex devices.

The periodicity of DS, in time units, is called a Signal Period (SP). The SP of a network of devices is picked from a set of preconfigured values that are multiples of each other. As a result, a recurring device signal is recognizable as periodic at least at the highest value of the SP. In some embodiments, in order to conserve battery power, a device may scan for the DS at the highest value of SP and once found, check for more frequent SPs from the possible set of known SP values.

The DS also defines a timing framework that allows neighbors to determine the time reference being used in another device. This time reference may be used for coordinating resources for communication or interference avoidance.

A device signal has a base identification component (referred to herein as the DSID), and a signaling block (referred to herein as the DSB). In some embodiments, the DSID is encoded into a modulated signal and may possibly use a specific time, frequency and/or code resource. The DSB signals are expected to convey only a few bits of information, such as the padding, resource request or resource grant.

Further, in some embodiments, the control or data signals transmitted by a device in the DSB may leverage known DSIDs of the device to facilitate decoding. In particular, the known DSIDs may act as pilots.

Further, in some embodiments, the resources required for the DSB are implicitly assumed to have been allocated to and used by the sender of the DS signal. In other words, the DSB resources are reserved at the same time as the DSID resources.

In some embodiments, the transmitted signaling, such as the user identifiers, and data allocations of the device are accompanied by a previously configured pattern and identity of reference signals. In other words, a transmitter using a particular DSID uses a particular set of reference signals sent in particular resources, which is distinguishable from reference signals transmitted by another transmitter using a different DSID. The universe of reference signals, corresponding resources referred to as P, and the mapping from the universe of DSIDs to P, is known at the devices. Such knowledge, may, for example, be known through a previous configuration.

Each device is aware of the device signals used by the neighbors in the neighbors set of the device. When a device joins a network, the device obtains a DS that is unique within its neighbor set, as described below. However, such DS may be re-used by other devices within the network or within other networks that are outside of the neighbor set of the particular device. Thus, as provided herein, a solution where the DSs may be reused two hops away is described. However, in other embodiments, the uniqueness of the DS may be expanded to three, four or more hops.

Reference is now made to FIG. 1, which shows a plurality of devices. In the embodiment of FIG. 1, device 110 communicates with and has a neighboring set of devices 120 and 122. In accordance with the above, devices 110, 120 and 122 have different DSs that are distinguishable from each other.

Further, device 120 communicates with devices 122 and 130. Device 122 communicates with devices 110, 130 and 132. Device 130 communicates with devices 132, 122 and 120.

In the example of FIG. 1, device 132 communicates with device 140 and devices 122 and 130. Further, device 140 communicates with devices 150 and 152.

In accordance with the above, while DS for device 110 is unique when compared to devices 120 and 122, this does not restrict the other UEs within the network from having the same DS. For example, in the embodiment of FIG. 1, device 140 may have the same DS as device 110 since they are not within one node of each other. Similarly, device 150 may have the same DS as device 122 since they are not within one node of each other.

One advantage of reusing DSs within a network is that not as many unique identifiers are needed, thereby reducing the need size of the transmission of DSIDs and the decoding requirements for neighboring DSIDs.

The ability to reuse a DS is enhanced through a disambiguation procedure, as provided below, which preserves the uniqueness of the DSIDs within the neighbor set.

In the Third Generation Partnership Project (3GPP), a DS may be introduced, for example, in the 3GPP TS 36.300, "*Evolved Universal Terrestrial Radio Access (E-UTRA) and Evolved Universal Terrestrial Radio Access Network (E-UTRAN); Overall description; Stage 2*", v.11.5.0, Mar. 8, 2013, the entire contents of which are incorporated herein by reference. Table 1 below shows one example of such change in bold.

TABLE 1

Example changes to 3GPP TS 36.300, sections 5.1.4 and 5.1.7.3

5.1.4 Downlink Reference signal and synchronization signals
The downlink cell-specific reference signals consist of known reference symbols inserted in the first and third last OFDM symbol of each slot for antenna port 0 and 1. There is one cell-specific reference signal transmitted per downlink antenna port. The number of downlink antenna ports for the transmission of cell-specific reference signals equals 1, 2, or 4.
Physical layer provides 504 unique cell identities using Synchronization signals.
The downlink MBSFN reference signals consist of known reference symbols inserted every other sub-carrier in the 3rd, 7th and 11th OFDM symbol of sub-frame in case of 15 kHz sub-carrier spacing and extended cyclic prefix.
In addition to cell-specific reference signals and MBSFN reference signals, the physical layer supports UE-specific reference signals, positioning reference signals and CSI reference signals.
In the device-to-device case, in addition to the signals above, in the scenarios without network coverage, the UEs may transmit device signals to identify devices that are in in a device's neighbourSet. Physical layer provides XX - 1

| TABLE 1-continued |
|---|
| Example changes to 3GPP TS 36.300, sections 5.1.4 and 5.1.7.3 |
| number of unique UE device signals, and one signal is reserved for a new device identifier. The device signals may be used to establish synchronization and identity of devices that are outside of network coverage.<br>Device signals are carried in AA subcarriers and BB symbol times of the CC subframes [not overlapping with existing PSS/SSS].<br><. . .><br>5.1.7.3    Cell search<br>Cell search is the procedure by which a UE acquires time and frequency synchronization with a cell and detects the Cell ID of that cell. E-UTRA cell search supports a scalable overall transmission bandwidth corresponding to 72 sub-carriers and upwards.<br>E-UTRA cell search is based on following signals transmitted in the downlink: the primary and secondary synchronization signals.<br>The primary and secondary synchronization signals are transmitted over the centre 72 sub-carriers in the first and sixth subframe of each frame.<br>Neighbour-cell search is based on the same downlink signals as initial cell search.<br>In the device-to-device case, in addition to the primary and secondary synchronization signals above the authorized devices will scan for device signals to support the in the scenarios without network coverage. As with the primary and secondary synchronization signals, the device signals are also transmitted over the centre 72 sub-carriers in the Kth and Lth subframe of each frame. |

Further, changes may be made in 3GPP TS 36.331, "*Evolved Universal Terrestrial Radio Access (E-UTRA); Radio Resource Control (RRC); Protocol specification*", v.11.3.0, Mar. 18, 2013, the entire contents of which are incorporated herein by reference. Table 2 below shows one example of such change in bold.

| TABLE 2 |
|---|
| Example changes to 3GPP TS 36.331, sections 4.2 and 5.14 |
| 4.2    Architecture<br>4.2.1    UE states and state transitions including inter RAT<br>A UE is in RRC_CONNECTED when an RRC connection has been established. If this is not the case, i.e. no RRC connection is established, the UE is in RRC_IDLE state. The RRC states can further be characterised as follows:<br>    RRC_IDLE:<br>        A UE specific DRX may be configured by upper layers.<br>        UE controlled mobility;<br>        The UE:<br>            Monitors a Paging channel to detect incoming calls, system information change, for ETWS capable UEs, ETWS notification, and for CMAS capable UEs, CMAS notification;<br>            Performs neighbouring cell measurements and cell (re-)selection;<br>            Acquires system information.<br>            Performs logging of available measurements together with location and time for logged measurement configured UEs.<br>            When no network coverage is available, monitor out of coverage device signal channel to detect device to device networks that may be available for connection.<br>    RRC_CONNECTED:<br>        Transfer of unicast data to/from UE.<br>        At lower layers, the UE may be configured with a UE specific DRX.<br>        For UEs supporting CA, use of one or more SCells, aggregated with the PCell, for increased bandwidth;<br>        For UEs supporting out of coverage communication, establish UE identity and determine neighbourSet<br>        Network controlled mobility, i.e. handover and cell change order with optional network assistance (NACC) to GERAN;<br>        The UE:<br>            Monitors a Paging channel and/or System Information Block Type 1 contents to detect system information change, for ETWS capable UEs, ETWS notification, and for CMAS capable UEs, CMAS notification;<br>            Monitors control channels associated with the shared data channel to determine if data is scheduled for it;<br>            Provides channel quality and feedback information;<br>            Performs neighbouring cell measurements and measurement reporting;<br>            Acquires system information.<br>            Monitors neighbourSet device signal strength and updates the current neighbourSet<br><. . .><br>5.14 Maintaining neighbour device identities out of coverage<br>UEs will use capability bits to indicate the ability to operate in D2D mode out of eNB coverage. If the UE is operating in D2D mode out of eNB coverage it shall attempt to connect to an existing network, either in network coverage or out of |

TABLE 2-continued

Example changes to 3GPP TS 36.331, sections 4.2 and 5.14 it. If an out of coverage network is found the UE sets the device signal identity as newDeviceSignalIdentity.
Once part of a out of coverage network the UE shall maintain a neighbourSet.
Physical layer will report device identities of new neighbours in the MAC.

Figure 2:
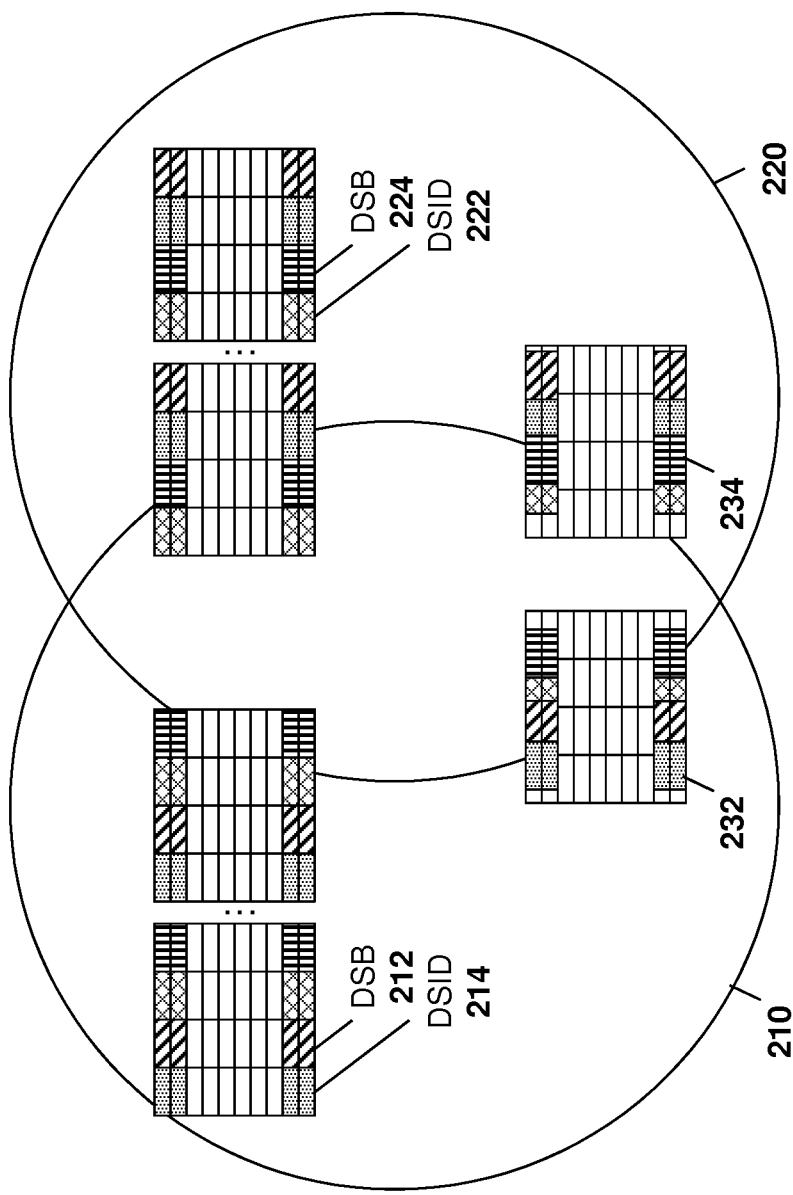
FIG. 2 is a block diagram showing signaling blocks as seen by various timing references.

Reference is now made to FIG. 2, which shows the timing of two devices that are neighbors of each other. Since the devices are neighbors, the two devices have different DSIDs.

The timing of the devices is shown in FIG. 2 as first device timing 210 and second device timing 220.

Within the first device timing, the first device has a DS comprising a DSID 212 and a DSB 214 in the signal grid.

Similarly, within the second device timing, the second device has a DS comprising a DSID 222 and a DSB 224 in the signal grid A first observer and a second observer detect the DSID 212 and 222 in a non-coherent fashion. Further, such DSIDs 212 and 222 may act as a pilots for neighbors for DSBs from the same device DSB 214 and 224 carry the signaling component of the DS which is expected to be decoded coherently by the neighbors who are already aware of the DSID. However, as seen by time plot 230, the first observer may have overlapping signals from DSID 212 and DSID 222.

Similarly, the second observer may have overlapping signals from DSID 222 and DSID 212, as seen by time plot 232. These overlapping signals from DSID 222 and DSID 212 may still be decodable by the observers that are not part of the network because the signals are separated in code and the observer may collect several samples of the periodically repeating signals.

The example of FIG. 2 is one possibility and other arrangements of coherent and incoherent signals are possible. The present disclosure does not provide the particular construction of any signal and such signal is beyond the scope of the present disclosure.

Configuration Information

In accordance with some embodiments of the present disclosure, it is assumed that some configuration information for D2D communication is available to devices. For example, this may be practical in scenarios such as in public safety, where the devices may be calibrated and configured when in coverage of public safety systems and before public safety personnel spread out to areas where there is no coverage. The public safety equipment may further be manufactured with some common configuration and may also be further configured periodically when being delivered to first responders in accordance with the requirements of end users.

Further, some aspects of the system may be standardized. For example, in some embodiments, the location of the resources to transmit the DSs with respect to the band-center may be fixed in a standard, while the band-center itself may be left up to the configuration of the users such as in the public safety jurisdiction. In such a case, the band center may be calibrated and configured at the public safety authority premises, for example, while the equipment manufacturer may design the device receiver to receive the DS signals at the appropriate frequencies spaced from the band-center.

Further examples of parameters that may have configurations includes slot sizes, new device signals (NDS), resource maps, maximum SP, and/or range of permissible SP values, among others.

In some embodiments, due to the advantages of dynamic reconfiguration, some of the configuration information may be changed after the deployment in a given network. Dynamic reconfiguration may increase the complexity of the system and may be used in cases where it is needed. For example, such information may be provided in system information messages. The system information may be provided to new devices by existing devices after they join the network as one of the initial data transmissions to the new device, for example.

However in other embodiments, the amount of data that is needed to be provided dynamically is minimized in order to speed up the incorporation of isolated devices into the network.

Exemplary configuration parameters that may be known to devices that are out of eNB coverage include an operating band of the system, the frequency resources used for DSs, sequences used for DSIDs, available set of DSIDs for devices and NDS, a set of usable SPs, resources used for disambiguation network signals (DANS) and disambiguation device signal (DADS) with respect to the DS indicating reservation. Other possibilities exist.

Thus the present disclosure is not limited to any particular configuration, and parameters may be standardized, configured pre-deployment or dynamically configured during deployment of devices.

Identities

In accordance with the present disclosure, the identity at the radio access network (RAN) level is provided. While identifiers are available in other domains, such as authentication, such identifiers may not be available at the radio access network. The main use of identities at the RAN level is disambiguation for signals and communication. RAN level identities for UEs are provided by the eNB when it is present. However, in accordance with the present embodiments, no eNB is present and thus the unambiguous identities must be generated by the devices themselves.

In accordance with one embodiment of the present disclosure, to be unambiguously identified in the neighbor set, the devices need DSs that are unique within the neighbor set. The identity of a given device signal is referred to herein as the DSID. The larger the set of DSIDs, the more resources that are required for DS signals, as each DSID needs to be unique within the neighbor sets. In accordance with one embodiment of the present disclosure, signaling is provided which can reuse DSIDs that are used by devices more than two hops away. In other words, the DSIDs may be reused outside the neighbor set of a device's neighbors where such reuse does not cause ambiguity. However, in other embodiments, more than two hops may be used for unique DSIDs.

In addition to the DSIDs, devices have unique identifiers (UIDs) that can be represented by a bit-string. The UIDs may be embedded in the devices during manufacture. For example, such UIDs may be the Institute for Electrical And Electronics Engineers (IEEE) medium access control (MAC) addresses, or may be generated through some pseudo random function which may produce a UID bit-string of adequate length to ensure that the probability of another device with the same bit string is adequately small.

As such, there are two identifiers in the embodiments of the present disclosure. These are, first, the DSID, which is only required to be unique within each neighbor set and may change due to changes in neighboring devices; and second, the UID which is expected to be unique within the system and expected to be either permanent or to change infrequently.

New Devices

As used herein, a new device is one that does not have a valid DSID. It is not therefore part of a neighbor set and does not have a neighbor set of its own to begin with. This is contrasted with devices that are already in the network which have a valid network set and DSID.

In order to obtain a valid DSID, a device coming into the network needs to request the neighboring devices to provide a usable DSIDs or set of DSIDs. Such neighboring devices are the potential neighbor set for the new device. In order to join the network, a new device needs to determine its neighbor set and become part of the neighbor set of its neighbors. Further, the device needs to pick a DSID that does not cause ambiguity in the neighbors' neighbor set.

In particular, the DSID picked by the new device should not overlap with the DSID of the observable neighbor set. Further, in order to avoid ambiguity with devices that are not directly observable by the new device, a new device may only pick an identifier that is not present in the neighbor set of devices in its own neighbor set.

Specifically, a new device may start by scanning the known resources where a known set of DSIDs is expected to be transmitted. The scan procedure may provide any new devices with a repeating sequence of one or more DSIDs, where there is a possibility of a link to be established. The repeating sequence may also yield the SP used by the potential neighbor devices.

Next, a new device may determine the resources to send a new device signal (NDS) to the network devices. The above scan procedure may be effected in a manner similar to the LTE function where eNBs transmit the PSS/SSS which are scanned and decoded by unsynchronized UE in a similar manner.

In accordance with one embodiment of the present disclosure, a new device signal, which is analogous to a signal for a DS for new devices that is known to all devices, may be transmitted. The NDS uses a system wide reserved DSID.

Unlike other device signals in the embodiments described herein, the NDS does not belong to a particular device. However, each device in the system ensures that resources are made available for the new device signal. Each device is expected to set aside at least one NDS resource per an integer multiple of SP in accordance with one embodiment.

Furthermore, the resources that are set aside by a device for NDS may be computable by a new device by merely observing DS transmissions for a configurable multiple of SPs.

In order to identify resources for the NDS, a function may be defined that identifies NDS resources that are made available by the device. A result of the function may be found given a time interval equal to the k×SP, where k is a configured integer constant, and instances of DS transmissions for a device during an observed interval of time no less than SP. The function could, for example, be one that computes a time slot of a size sufficient to receive the NDS from any new device within an expected range, and centers the NDS between the most widely separated DS transmissions within SP.

In some embodiments, parameters such as k, SP, minimal slot size for a DS reception and expected range may be determined during system configuration and conveyed in system information broadcasts transmitted by devices that are in a network. In other embodiments, these parameters may be pre-specified, for example in a standard or by a device manufacturer or carrier, and programmed into the devices.

Thus, when picking the timing of a DS, a device may need to space at least two of its DS transmissions appropriately to provide appropriate NDS resources. In these periodic NDS resources reserved by a device, the device may scan for transmitted NDSs by a new device within range.

In a further another embodiment, some DS signals may indicate that a slot of a sufficient size A time units after said signal is reserved for NDS. Such indication may, for example, be inside the DSB. Further, in some embodiments the parameter A may be pre-configured.

A new device determines the signaling period of its neighbors and finds the DSIDs being transmitted during the SP. It may then compute the set of NDS resources that ensures that all potential neighbors will be attempting to receive at least one of the NDS transmissions, before transmitting the NDS. In order to reach all neighboring devices, the new device may be required to transmit more than one NDS during the same SP.

The neighboring device procedures however may remain the same when receiving more than one NDS in the same SP as those employed when only one NDS is received.

Cell selection may be introduced, for example, in the 3GPP TS 36.304, "*Evolved Universal Terrestrial Radio Access (E-UTRA); User Equipment (UE) procedures in idle mode*", v.11.3.0, Mar. 18, 2013, the entire contents of which are incorporated herein by reference. Table 3 below shows one example of such change in bold.

TABLE 3

Example changes to 3GPP TS 36.304, section 5.2.3.1

5.2.3  Cell Selection process
5.2.3.1  Description
The UEshall use one of the following cell selection procedures:
    a)  Initial Cell Selection
        This procedure requires no prior knowledge of which RF channels are E-
        UTRA carriers. The UE shall scan all RF channels in the E-UTRA bands
        according to its capabilities to find a suitable cell. On each carrier frequency,
        the UE need only search for the strongest cell. Once a suitable cell is found
        this cell shall be selected.
    b)  Stored Information Cell Selection
        This procedure requires stored information of carrier frequencies and
        optionally also information on cell parameters, from previously received
        measurement control information elements or from previously detected cells.
        Once the UE has found a suitable cell the UE shall select it. If no suitable
        cell is found the Initial Cell Selection procedure shall be started.

TABLE 3-continued

Example changes to 3GPP TS 36.304, section 5.2.3.1 c) Device-to-device network selection
This procedure is employed when the process a) or b) fail in UEs that are authorized to operate out of eNB coverage. UE shall scan the device signals to determine the existence of a device-to-device network or the existence of other UEs also searching for a device-to-device network. If a device to device network is detected it will use request assignment of its own device signal in the device to device network by using the new device signal (where the new device signal is a reserved device identifier, provided by the physical layer).

d) Device-to-device network selection
If no device-to-device network is detected by at least one device that is performing device-to-device network section is detected then the device forms a device-to-device network using the procedure described in XX [Ed: Section 6.5.7 in this document]. If no device-to-device network or another device that is performing device-to-device network section is detected then it will periodically repeat the process.

NOTE:
Priorities between different frequencies or RATs provided to the UE by system information or dedicated signalling are not used in the cell selection process.

Ambiguity

Various situations may arise in which ambiguity may be created in the network. In order to eliminate such ambiguity, various embodiments of the present disclosure provide for solutions to ambiguity.

Figure 3:
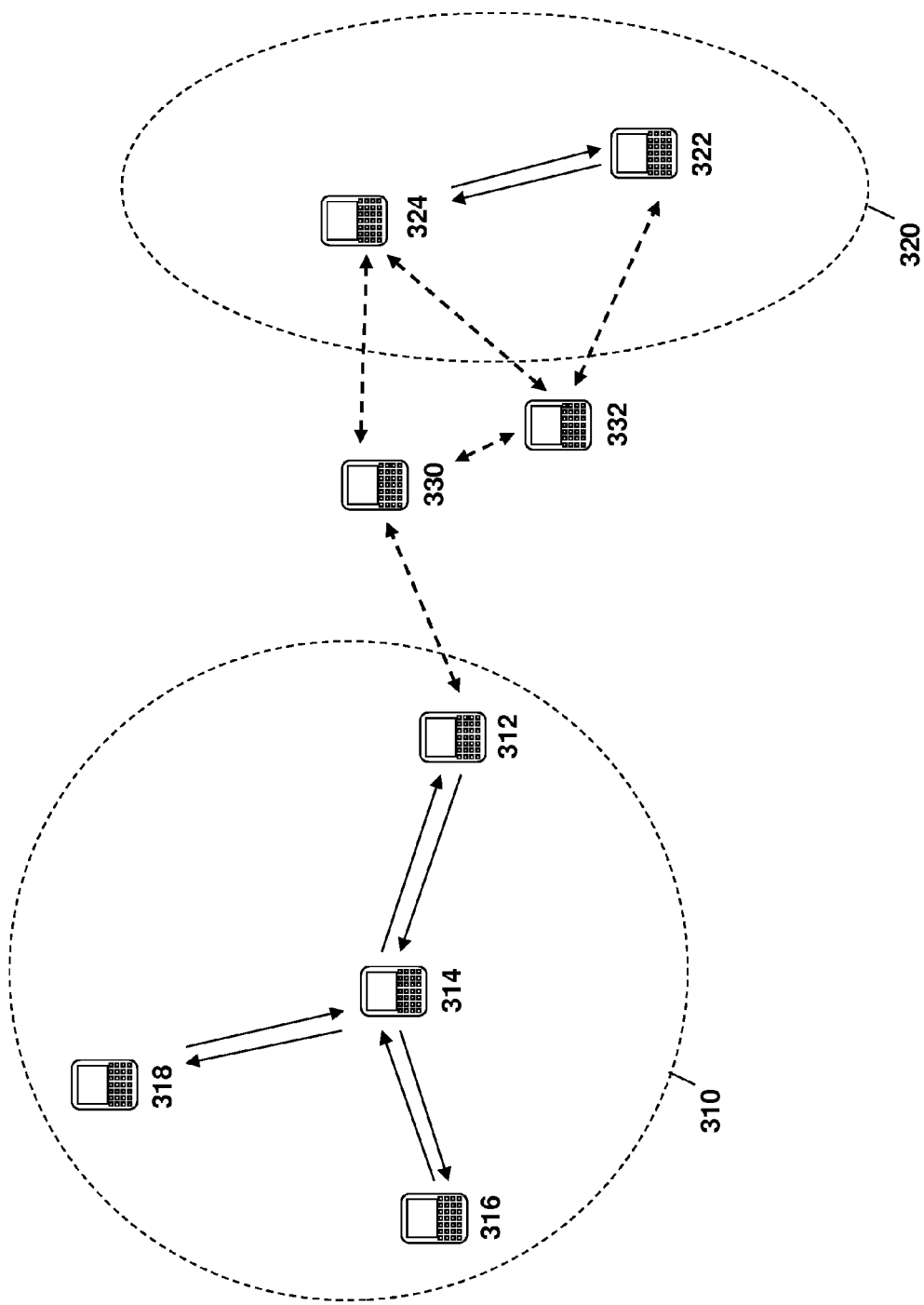
FIG. 3 is a block diagram of an exemplary wireless system showing two networks and having two new devices added.

In a first case, when a new device attempts to enter into a system, there may be a potential for ambiguity in the DSIDs. In particular, reference is made to FIG. 3, in which two sets (networks) of devices with valid DSIDs are provided. In a first set 310, devices 312, 314, 316 and 318 are shown as part of the network. In a second set of DSIDs, shown by reference 320, devices 322 and 324 are part of a second network.

Two new devices, shown by references 330 and 332 wish to start D2D communication. In this case, device 330 can see both devices 312 and 324, where device 312 and 324 cannot see each other and are part of different networks of devices. Device 330 can also see device 332.

Device 332 can see device 330 and can also see devices 324 and 322.

Since devices 312 and 324 are not in each other's range before the arrival of device 330, devices 312 and 324 had no reason to ensure that the DSID of device 312 did not conflict with the DSID of device 324. The insertion of device 330 in the middle causes the creation of a neighbor set in device 330, where devices 312 and 324 need to be accommodated unambiguously. This may therefore cause an ambiguity irrespective of the DSID that device 330 is assigned. Such ambiguity is referred to below as network ambiguity.

Further, devices 330 and 332 are both within range of device 324. If both try to join the network at about the same time, device 324 will receive various new device signals. The new device signal seen at device 324 therefore needs to be disambiguated such that both devices 330 and 332 are identified unambiguously in the neighbor set of device 324. The ambiguity created by multiple new devices is referred to herein as new device ambiguity.

Further, both devices 330 and 332 are new devices within a range of each other. Therefore, the NDS they send to each other needs disambiguation as well. Since this is the same ambiguity as at the start of the system, when two isolated nodes are attempting to connect, this is referred to herein as startup ambiguity.

Each of network ambiguity, new device ambiguity and start up ambiguity are discussed below.

The general approach to resolving ambiguity involves distinguishing the ambiguous devices with their UIDs. When an ambiguity is possible, such as when devices join a network, resources are provided for potentially ambiguous devices to identify themselves in a distinguishable manner. This may involve transmitting at least some part of the UID to other devices within range.

If there is DS ambiguity, at least one device in range detects such DS and lets the ambiguous devices know. The device letting such ambiguous devices know of ambiguities is referred to herein as a disambiguator. More than one disambiguator may detect the same disambiguity at the same time.

At this point, the ambiguous devices provide the disambiguator with the options they have to resolve the ambiguity. For example, if there is network ambiguity, one or more devices may need to change their DSID, and ambiguous devices may prove other DSIDs that they may, or may not, be able to use. In other cases other information could be provided.

The receipt of the options by the disambiguator allows the disambiguator to find solutions to the ambiguity and transmit such solutions back to the ambiguous identities. The transmission may be implicit or explicit and may tag the respective solutions with the respective UIDs. For example, if a new DSID is needed, then the disambiguator may provide such DSID to the ambiguous identity and provide a tag with the respective UID to the new DSID. A device with such UID then knows to use the new DSID and other devices will ignore the message. Such technique and sequencing of resolutions resolves the various ambiguities in the system as described below.

In some embodiments, instead of the disambiguator finding solutions to resolve the ambiguity, it reflects the options for resolution of the ambiguity back to the ambiguous devices. The ambiguous devices are now able to resolve the ambiguity themselves based on preconfigured rules.

Incorporating New Devices without Ambiguity

When a device receives a new device signal, the device in the network may designate itself as a potential disambiguator, as well as a potentially ambiguous device, and allocates the resources of its neighbor set for disambiguation steps as described below using the DSB of the existing DS for the device. Specifically, as provided above, the DSB is used to indicate resource reservations to neighbors of the device and may be used to allocate resources for disambiguation.

In some embodiments, the reservation in response to the NDS may indicate to the neighbor set that resources for the disambiguation signals will use the same resources that would otherwise carry DSIDs, thus preventing use by neighbor devices of such resources for any previous ongoing device signals.

In some embodiments, the resources reserved for disambiguation may be distinct from the DS resources, allowing DS transmissions by neighbor devices to continue in parallel.

In either case, the responses to NDS are sent in a contention free manner using the resources reserved for disambiguation.

The new devices know the resources that are reserved for disambiguation, either by means of a configuration, or by reading the DSBs of network devices. For example, the set of resources may be configured to be similarly positioned as the resources to send the NDS but larger in size. Network devices are free to use these resources when there are no new devices, but reserve them for new devices upon the receipt of one or more NDSs.

In some embodiments, devices that are in the process of incorporating new devices or resolving ambiguity may indicate their status as such. For example, an unavailable identifier procedure (UIDP) pending indication may be provided, as described below. Such status may be conveyed, for example, in the DSB of the DS signals for the devices. Devices that receive such status indications may, in some embodiments, avoid sending new NDS or disambiguation requests until the current operation is completed and the status change is observable.

Further, as described above, network devices that receive NDS may reserve and release disambiguation resources for the requesting devices. The reserved resources are then used by new devices to transmit their disambiguation device signals (DADS) and for the devices in the network to transmit their disambiguation network signals (DANS).

The DADS and DANS signals convey several information bits and are, typically larger than DS signals, to allow UIDs to be carried in them. As such, in some embodiments, the UID bits are decoded coherently based on the DS transmission of the potentially ambiguous devices in the network. In the case that the ambiguous devices are not yet in the network, such as for new devices, a DS-like signal, such as the NDS, is used for coherent detection of the DADS, in some embodiments.

A UID may be sent in allocations along with the reference signals that are associated with the DSID used for the transmission. In some cases, more than one UID may be sent, for example in the case of reflection. Reference signals allow for robust coherent detection of the UID(s).

The description of the various signals is provided in Table 4 below.

TABLE 4

| | | Control Signals | |
|---|---|---|---|
| Signal | When sent | Made up of | Size and allocation |
| DS | Sent periodically | Contains DSID and DSB. DSB is expected to be a few bits containing basic signals like reservation. | Because DSB and DSID comprise of only a few bits the resources for them are implicitly allocated when new devices join. |
| DANS | Sent by network devices after reservation of resources for network device disambiguation signals is performed | Contains bits taken from network device's UID. This signal may be considerably larger and is thus only used when needed. | Possibly needs more bits and therefore requires explicit reservation when network device ambiguities need to be resolved. |
| DADS | Sent by new devices after reservation of resources for new device disambiguation signals is performed | Contains bits taken from UID of new devices. This signal may be considerably larger than DS and is thus only used when needed. | Possibly needs more bits and therefore requires explicit reservation when new device ambiguities need to be resolved. |
| NDS | Sent when new device wants to join | Contains a well known reserved DSID | Same as DS |

As seen in Table 4, each signal, its contents, its size and allocation and the sending periodicity are provided.

In some embodiments the DADS signals may use DSIDs other than NDS to improve the probability of decoding the UIDs. The use of DSID for DADS is generally separated in resources from normal DSID transmissions since resource reservations for DADS are effected before such transmissions are made.

Further, in some embodiments, the DANS, DADS, and the reflected versions of these signals may be transmitted a random number of times, separated by random intervals of time, in each of the stages of disambiguation to improve the robustness of the reception procedures.

While multiple transmissions may consume more resources, since the disambiguation steps are only undertaken at a configured interval, as well as the resource consumption of each instance which can be configured, a system design is able to trade off the robustness of disambiguation desired with the resources that may be needed during the disambiguation process.

In some cases, disambiguation device signals may not be successfully decoded at the disambiguator or the disambiguation network signals may not be successfully decoded by the new device. Some of these errors may be detected by the mismatch of UIDs. In this case, one option for a response to an error may be for the new device to try sending the NDS again.

Ambiguities may be resolved in a particular order. For example, in one embodiment, any potential network ambiguities may be resolved before any new device ambiguities. As such, a first set of resources reserved in response to an NDS message may be used by any networks to send their disambiguation signals, while the new devices act as disambiguators.

After network disambiguation is complete another set of resources may be used by the new device to disambiguate themselves and then join the network in a contention free manner. Such embodiments are described below.

In particular, network devices that receive an NDS signal use their DS as a pilot to transmit UIDs. The new device that sends the NDS then would detect network ambiguity if it decodes more than one different network disambiguation signal with at least two UIDs but with the same DSID.

For example, consider the case where two devices with UIDs, designated as device A and device B respectively, that are not neighbors of each other and do not share a common neighbor, have the same DSID. If a new device N transmits an NDS signal that is received by both devices A and B, then a network ambiguity is possible. When devices A and B transmit their DANS indicating their UID in the DSB of the same DSID, N is able to detect the network ambiguity.

A new device that then detects a network ambiguity may indicate the event by reflecting the conflicting DANS that is received. The new device may then send the same DSID and indicate all the UIDs that the new device has received. This enables the network device receiving the reflected DANS to determine the exact devices they may share an ambiguity with once the new device enters their system and the network devices may then rectify the situation.

In the example above, after receiving the UIDs A and B, new device N sends out two transmissions with the same DSID, and the two UIDs as received. These UIDs are now received by both devices A and B. Devices A and B further note each other's UIDs as a detected conflict when N enters the system.

Further, in some embodiments, the absence of UIDs in the reflected DANS is an indication that no ambiguity is detected. If there is no network ambiguity detected, the system may skip ahead to the next step where the DADS signals are sent, distinguishable by the use of NDS as the base signal instead of DS.

Once network ambiguity is detected it must be resolved. Knowing that there is an ambiguity two hops away does not allow the ambiguous nodes a way for rectification because they do not directly see the ambiguous DSs.

To resolve the ambiguity, the devices that finds out their DSIDs are ambiguous provide their possible alternate DSIDS to the disambiguator. The possible alternative DSIDs are derived from the two hop neighbor DSID set.

In order that such possible alternative DSIDs are provided in a consistent manner, the ambiguous devices request their neighbors perform an unavailable IDs procedure (UIDP), which indicates the DSIDs that are unavailable to the requestor. The request for the procedure is indicated in the DSB of the DS signal. In some embodiments, the set of unavailable identifiers is maintained by periodic updates that are sent in signaling to neighbor sets of devices.

When a request to perform an unavailable identifier procedure is received, a device may send its latest neighbor set to the requestor. In addition, the DSID for such device is not changed until a UIDP end indication is sent from the UIDP requestor, which indicates an end of the procedure. In some cases when an ongoing UIDP procedure is pending at a device, it may respond with a UIDP pending message instead of providing its neighbor set. To recover from errors, in some embodiments a UIDP timeout message is sent to the requestor when the UIDP procedure takes longer than a threshold unit of time.

In some embodiments, a UIDP rejection message may be sent to possibly avoid the pending wait. Otherwise normal functions, such as allocations for data transfer, may continue until the UIDP completes or the device times out.

After obtaining the unavailable IDs, an ambiguous device can then send the available/unavailable options for alternative DSIDs to the disambiguating device, which can then pick a DSID that will be unambiguous and indicate the new DSID to the ambiguous nodes that need to change their DSIDs.

After obtaining the unavailable IDs, an ambiguous device can send the options to the other devices that it shares its ambiguity with. This can be done in some embodiments by relaying the unavailable IDs via the disambiguating device. Once the alternative IDs and UID of the device are known at the ambiguous nodes, the nodes can perform resolution of new DSIDs in a distributed fashion.

In some cases network devices performing the disambiguation may be used to enhance security of the network.

In further embodiments, the devices that have more usable DSIDs available to them may change the DSIDs and UIDs are used as tie breakers to choose between the ambiguous devices.

Figure 4:
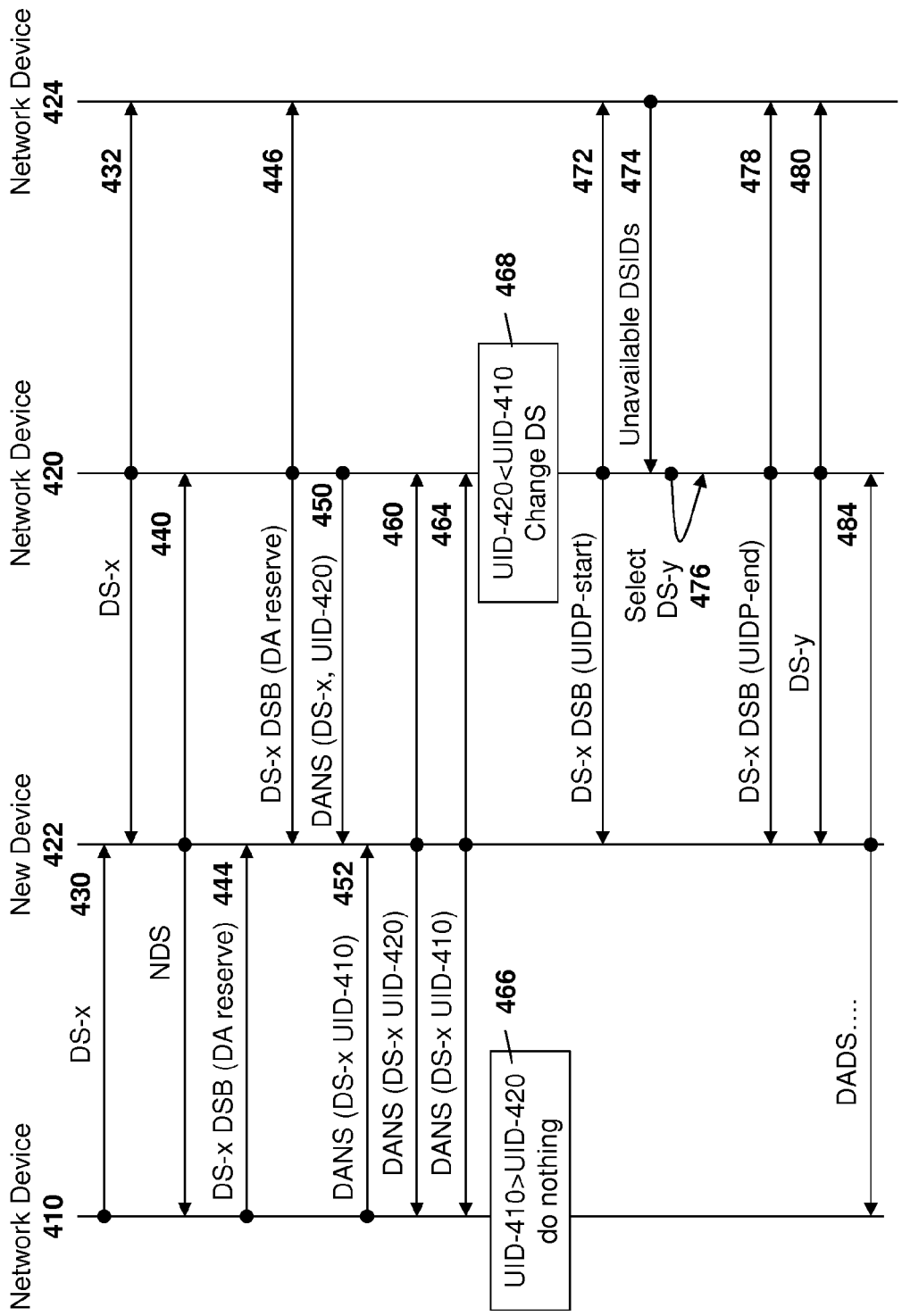
FIG. 4 is a signaling diagram showing the elimination of network ambiguity.

Reference is now made to FIG. 4. FIG. 4 shows an example of a process for a network disambiguation between a network device 410 and a network device 420. A new device 422 can see both network device 410 and network device 420, but devices 410 and 420 cannot see each other.

Further, network device 420 is in a network with a further network device 424, that it can see.

Network device 410 transmits its DS and can be heard by new device 422, which can then determine the resources for sending an NDS. Sending of the DS is shown by message 430.

Similarly, network device 420 sends its DS, as shown by message 432 and both new device 422 and network device 424 may receive the DS. New device may use message 432 to determine the resources for sending an NDS.

As seen in the embodiment of FIG. 4, network device 410 and network device 420 have the same DSID, shown by DS-x in the example of FIG. 4.

Once new device 422 determines the resources for sending an NDS, the message can be sent to the devices that the new device can see, in a manner that each such device receives at least one NDS transmission. Such NDS transmission is shown by message 440 in the embodiment of FIG. 4. In other embodiments, more than one message may be used.

Once network device 410 receives the NDS, it sends a reservation signal in the DSB to its neighbor set to reserve resources for the disambiguation signals, as shown by message 444. Similarly, network device 420 sends a reservation signal in the DSB to its neighbor set to reserve resources for the disambiguation signals, as shown by message 446 in the embodiment of FIG. 4.

New device 422 acts as a disambiguator and receives the disambiguation network signals (DANS) from the network devices in the form of messages 450 and 452. Messages 450 and 452 are carried in the reserved data blocks from messages 444 and 446.

The new device 422 then reflects the DANS back to the ambiguous devices. In particular, message 450 is reflected back to network device 410, as well as to network device 420, as shown by message 460.

Further, message 452 is reflected to network device 420 and to network device 410, as shown by message 464.

Network devices 410 and 420 each receive messages 460 and 464, and determine that there is a conflict since both are using the same DS. A conflict resolution rule known to each device may then be employed to resolve the conflict.

For example, in the embodiment of FIG. 4, the conflict resolution rule may be that the device with the lower UID needs to change the DS. Thus, if the UID of device 410 is greater than the UID for device 420 then device 410 may need to do nothing, as shown by block 466, and device 420 may need to change, as shown by block 468.

Since the device 420 needs to change in the example of FIG. 4, it sends an unavailable identifier process (UIDP) start message, as shown by message 472 to its neighbors.

Device 420 then receives unavailable DSIDs from device 424, as shown by message 474. Device 420 may then, based on all of the unavailable DSIDs found, select an available DS, as shown by arrow 476.

Once the DS is selected, device 420 may then signal the UIDP end, as shown by message 478.

The new DS that was selected may then be provided to the neighbors, as shown by message 480. Thus the rectification process ends by the devices that had been previously ambiguous sending their newly disambiguated device signals. This enables the next stage of disambiguation. At this point, all the network devices are in a state that if new devices that requested to join do so with unambiguous DSIDs there would be no ambiguous DSIDs in the new network.

Once the DSID disambiguation process for network ambiguity is complete, the DADS can be sent, as described below and as shown by message 484 in the embodiment of FIG. 4.

Specifically, once the network disambiguation process is complete as described above, the new devices that had sent an initial NDS are disambiguated. The new devices that had sent an NDS message may use the NDS as a pilot to transmit their UIDs. As noted above, in some embodiments where the resources for DADS are distinct from the network device DS transmission resources, the new devices can pick a DSID at random from a subset of DSIDs to allow for more pilots to be available for detecting the new device UIDs.

Additional distinctions, such as one or more bits in DSB may also be used to distinguish the different DADSs and reflected DADSs. Also, as indicated above, the transmission of DADSs may be made multiple times spaced by random intervals for additional robustness of decoding. The new devices and the network devices receive these DADS transmissions for a preconfigured time before the reflection occurs. Devices may use several of the multiple transmissions to eliminate incorrectly detected UIDs.

New device ambiguities are detected in both the network devices and new devices themselves. All such detections need to be resolved. A network device may detect new device ambiguity if it decodes more than one device disambiguation signal, each with a different UID. Furthermore, a new device detects other new device ambiguities that may not be seen by the network devices when the new device decodes a DADS disambiguation signal that has not been reported by the network devices. This case may occur, for example, when there are two new devices, referred to as device N and device M, that attempt to join the system at the same time. If device N and device M are within each other's range and are within the range of two devices A and B respectively, that are in a network, but device A is out of range of device M and device B is out of the range of N, then the DSIDs that N and M are assigned may conflict with each other causing new device ambiguity. The potential ambiguity is detected if device N and device M detect each other's DADSs.

In order to resolve a new device ambiguity, after the network devices have resolved to a state where the joining of new devices does not cause ambiguity in the existing network devices, the network devices that have received the NDS may transmit the new device UIDs that each has received, as well as unavailable DSIDs.

Such transmitting devices also treat themselves as being in a UIDP pending state so that they do not change the set of unavailable DSIDs until the new devices have resolved any ambiguity.

For the new device ambiguities detected by the new devices themselves, the new devices send out the unavailable DSIDs that they have received. At this point, all new devices have the UIDs of the other unavailable DSIDs. The new devices can then select DSIDs from available DSIDs in a consistent manner.

Consistency may be achieved, for example, by using a deterministic function with the conflicting UIDs as arguments. For example, the UIDs may be used as tiebreakers in the function. Thus, given a set of all available DSIDs the device has, the device having the largest UID in a potential neighbor set gets the largest DSID in the set of available DSIDs, and so forth. However, other consistent sharing functions are also possible.

In other embodiments, the network devices may receive the new device detected ambiguity, and perform a consistent allocation on behalf of the new device. New devices must have received the DS of at least one network device to be in this step.

Figure 5:
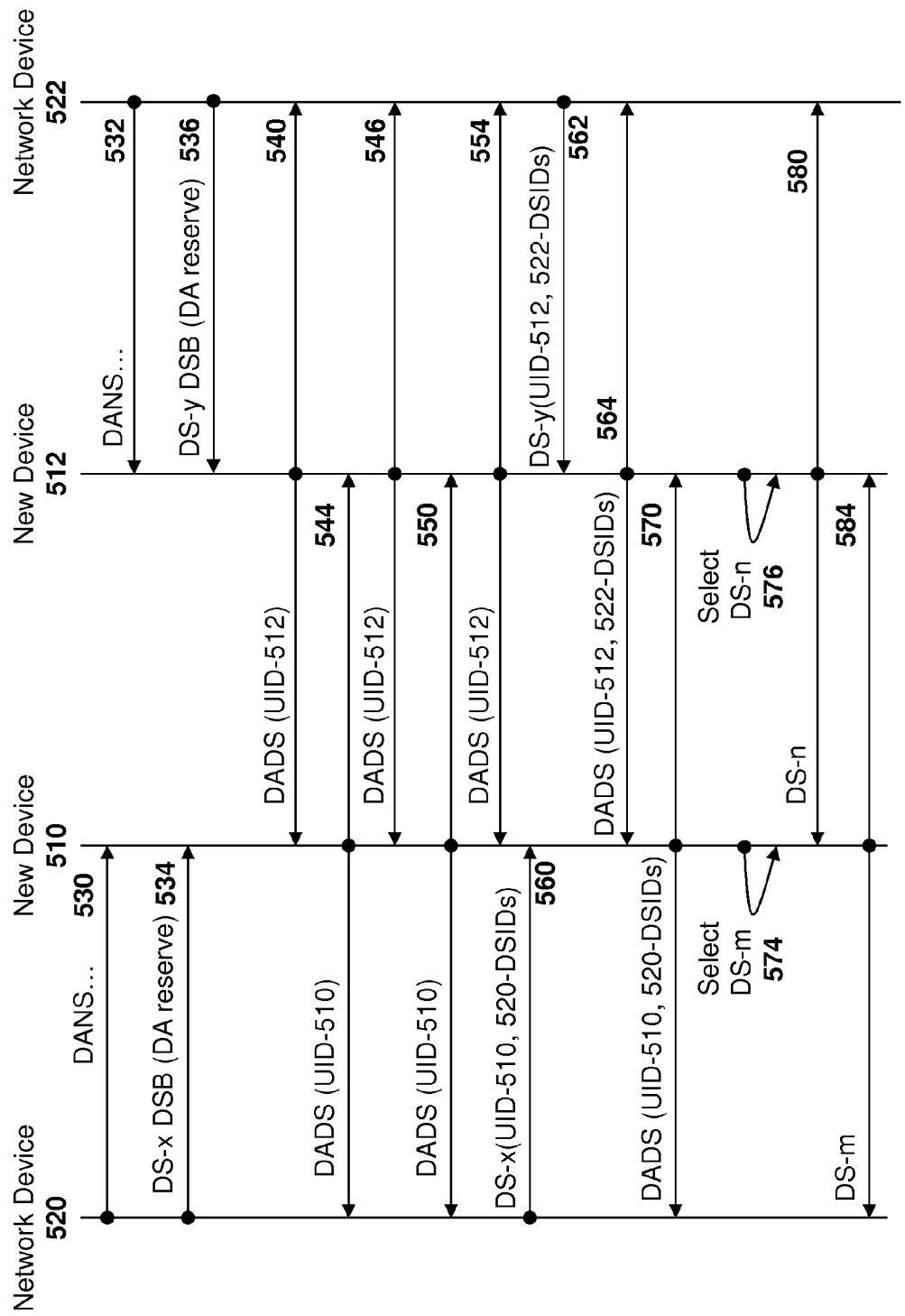
FIG. 5 is a signaling diagram showing the elimination of new device ambiguity.

Reference is now made to FIG. 5, which shows an example of a new device disambiguation process. Two new devices, namely devices 510 and 512, join a system simultaneously. In this case, network device 520 receives the NDS for the new device 510 and network device 522 receives the NDS for a new device 512. The new devices 510 and 512 proceed through the disambiguation process shown above with regard to FIG. 4 and receive the DANS messages represented by 530 and 532 respectively. Message 534 and 532 are in response to a message such as messages 480 from FIG. 4.

Since the network devices received the NDS, there may be ambiguities. As such, resources for DADS are then reserved by network devices as shown by messages 534 and 536 in the embodiment of FIG. 5. Such messages include information regarding existing neighbors in a DSB.

In the disambiguation device service, the new devices alternate between transmitting their DADSs and attempting to receive other DADSs in order to avoid new device ambiguity. Thus, at least one, but typically more than one, DADS messages are then sent from new devices. In the example of FIG. 5, a DADS message is sent from device 512 to new device 510 and network device 522, as shown by message 540. Message 540 contains the UID of device 512.

Similarly, message 544 from new device 510 to new device 512 and network device 520 provides the DADS message with a UID for device 510.

The messages may be repeated, as shown by messages 546, 550 and 554 to ensure reception, even if collisions occur.

After message 554, both devices 510 and 512 recognize that there is a new device ambiguity as well as their relative ordering when picking the DSIDs from the available set.

In response to receiving the DADS messages, network device 520 provides the UID of device 510 and available DSIDs in message 560. Similarly, message 562 from network device 522 to new device 512 provides the identifier for new device 512 as well as available DSIDs from the perspective of device 522.

Messages 560 and 562 use data blocks reserved for DADS, and such data block are in turn communicated between the new devices, as shown by messages 564, and 570.

Each device then picks a DSID that will not conflict with the other because of the ordering that was determined with the exchange of DADSs from messages 540 to message 554. In particular, device 510 selects a DS, as shown by reference 574, and device 512 selects a DS, as shown by reference 576.

The selected DSIDs can then be communicated, as shown by message 580 from new device 512 and by message 584 from device 510.

In some embodiments, instead of reflecting the UIDs, the disambiguator device may provide only the ordering of the ambiguous devices, thereby providing sufficient information for the ambiguous devices to pick consistent DSIDs with less overhead. This optimization may be used for both new device and network ambiguities in one embodiment.

At the end of the process of FIG. 5, the new devices have DSIDs that are unambiguous in the device network.

Bootstrap

As indicated above, a further ambiguity is startup ambiguity. This occurs when a device does not find a network to join.

In one embodiment, a new device that does not have a neighbor set will start by listening for DSs for some number of SPs to identify its neighbors. However, in some cases there may be no DSs observed, because either there are no devices within range or because none of the devices that are in range have a valid neighbor set and therefore do not have a valid DSID.

A device that does not have a valid neighbor set and has not found a network for a configurable number of SPs, in one embodiment, may autonomously compute the resources available for sending NDS and pick resources to transmit at least one NDS periodically. Along with the NDS, the device may also send at least one signaling bit in a DSB indicating that no network is available. Timing may be established based on this NDS transmission.

During part of the remainder of the SP, the new device may then listen for other NDSs and transmit NDSs after random intervals. This allows the new device to observe the NDSs of other new devices.

When a new device that has not found a network for a configurable number of SPs receives an NDS indicating that no network is seen from another device, the new device assumes that the transmitting device has an implicit allocation of the usually available resources, or is configured with the resources reserved for disambiguation. This allocation may be similar to the implicit resources allocated for NDS, but with more resources.

The new device then transmits DADS with its UID in those resources. The new device performs this transmission after random sub intervals of an SP through a configurable number of SPs known to the new devices, while also listening for DADSs from other new devices when not transmitting.

In one embodiment, the transmitting may be randomly spaced in time such that the probability of a new device not being able to obtain the UID of the neighboring device is sufficiently low.

Next, devices reflect the largest UIDs they have received directly from their neighboring new devices to allow all devices within range to note the largest UID of the devices that are up to two hops away. In some embodiments, devices may use randomly selected DSIDs to send the DADS, with no network DSB indication, which is then reflected back, when necessary, with the same DSID. This allows for better detection probability of the UIDs.

Specifically, the devices that have the largest UID in their two hop neighbor set independently pick a DSID. These devices proceed to transmit their DSs every SP with the DSID they have picked. Additionally, the devices indicate their UID in corresponding transmissions.

Since, the largest UIDs are reflected, devices that independently pick DSIDs are at least two hops away. As a result, there is never a conflict between devices that picked DSIDs independently and the neighbors who still do not have a DSID. Devices that do not pick a DSID receive the DSs and send NDS signals to join the newly formed network.

If a device has an error in the reception of a message, it may wait for an existing set of devices to complete the creation of the network for a configured period of time. At that point, the device observes that instead of receiving NDSs it receives DSs from the devices that have formed a network. The device can then request to join the network by using the procedures described above.

As will be evident to those skilled in the art, errors in decoding UIDs may still occur and in most cases would cause the reflection of a UID that is not present in the receiving set of devices. This and other errors may be recovered from by a timeout of the DADS exchange procedure, after which the devices start again by sending NDSs.

In some embodiments, the system may use more resources for bootstrapping and the devices reflect all the UIDs they have received from their neighboring devices. The device that has the largest UID in the neighbor set picks the DSID as above. However, other devices wait for the DSs from the neighboring devices with larger UIDs to be received and then pick their own DSID from the remaining DSIDs. This provides that several devices can follow each other in picking DSIDs in less time.

If the new device finds an NDS signal with no network bit reset, it may stop transmission of its NDSs and wait for the bootstrapping device to obtain a DSID. One example of the above is provided below.

Figure 6:
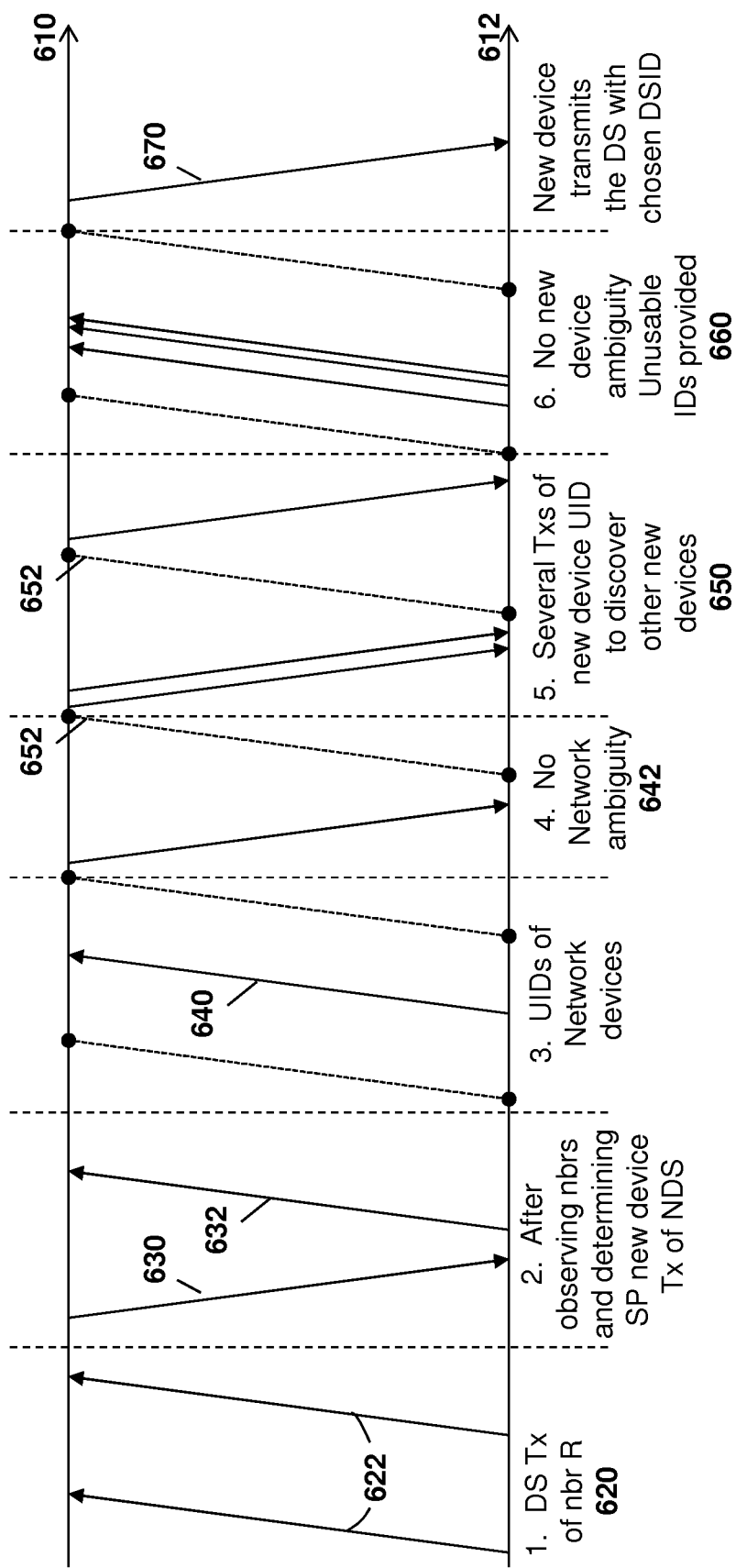
FIG. 6 is a signaling diagram showing addition of a new device into a network.

With the bootstrap procedure along with the other new device procedures defined in the eNB-less D2D signaling system based on DSs, the system is able to allow new devices to join or indeed start a new system. In the example of FIG. 6 below, an example of the join procedure of a new device that did uncover any possible ambiguities is provided.

In particular, in the embodiment of FIG. 6, a new device's internal timeline is shown with line 610 and the network device's timeline is shown by line 612. Various stages are labeled in the figure. In a first stage 620, the new device observes its neighbors' DSs. In this case, the neighbor is labeled as device "R" with the DS depicted by line 622.

The new device sends the NDS signal after sufficient observation of the DS shown by line 630. The NDS is sent after determining the SP and the new device's NDS transmissions.

After receiving the NDS, neighboring device 612 signals the start of the disambiguation process using the next set of DSs sent to other neighbors in the next SP, as shown by line 632. Device 612 becomes the disambiguator for the new devices.

Resources are set aside for the disambiguation by device 612 and its neighbors. In accordance with a third stage, the network devices send their UIDs in DANS to allow the new device to uncover the network devices that may cause ambiguity. As shown by line 640, the UID is provided in a DS.

The new device acts as a disambiguator for network devices. In this case, no other network devices are found and the new device responds with a notification of this, shown by reference 642.

In the next stage, as shown generally by reference 650, the new device transmits its UID in a set of DADS messages that are randomly spaced through a set of SPs reserved for this process. During this time, in this example, the regular transmissions of DS by the neighboring devices are suspended. The SP intervals are shown with lines 652.

In the example of FIG. 6, no other new devices are found by the network, so the new device and the process proceeds to the next stage where there are no ambiguities remaining. Thus, device 612 indicates to the new device 610 unavailable DSIDs. In the example of FIG. 6, this is done by a DS signal as shown at stage 660.

At the end of stage 660, the new device 610 is able to pick a DSID and transmit its DS with tentative timing, as shown by the line 670.

Thus, FIG. 6 demonstrates the signaling procedures between a new device and an existing device.

Timing

While the previous sections provided methods for devices to determine unambiguous DSs that they transmit periodically, the methodology for DS transmissions to provide a timing reference in the system is provided below.

One embodiment allows for the providing of a timing reference for the system without a single controller. Specifically, the use of a single controller provides a single point of failure in a network and may be undesirable in some situations. The providing of the timing reference allows for devices to maintain individual clocks upon which they may base their reception, while transmitting according to the receiving devices' timing requirements.

For example, with respect to personal area networks (PANs) consider the example of three devices: X, Y and Z that are neighbors of each other. If a timing for device X is used to set the reference clock of both devices Y and Z and if X fails, then there would be ambiguity in the timing relationship between devices Y and Z, which may cause possible failure in the communication between devices Y and Z. Instead, the present disclosure provides for devices maintaining timing such that each sender and receiver has independent timings that only apply when they communicate with each other. In this case, if device X fails, the timing of the transmission and receipt of both device Y and device Z are not affected and communication can continue.

The approach may be realized by using the DS framework as defined above. New devices are initially allowed to transmit DSs with only approximate timing when joining a system. Existing network devices that participated in the join procedures and helped the new device acquire the DSID may provide a set of possible transmission opportunities in time to the new device in the form of corrections to the approximately timed DS signal. These opportunities are such that when the new device picks one or more of the opportunities to transmit its DSs, the network device that has offered the opportunity will be able to receive it.

Further, existing devices should attempt to use the minimal time resources possible to multiplex the number of DSs they need to receive or transmit. This creates a better system usage.

For half-duplex devices, multiple transmissions of the DS may be required to meet the receive requirements of all neighbors. While there is one DS transmission that is in the timing reference for a particular neighbor, more than one neighbor may use the same DS as a timing reference for a device. This leads to an efficient solution to the half-duplex problem. In particular, a transmission instance of a DS that is being used as a timing reference in a neighboring device is noted as such by both the transmitting and receiving devices, and corrections may be made to that particular instance. In some embodiments, a multiplicity of reference DSs may also be accommodated similarly.

Figure 7:
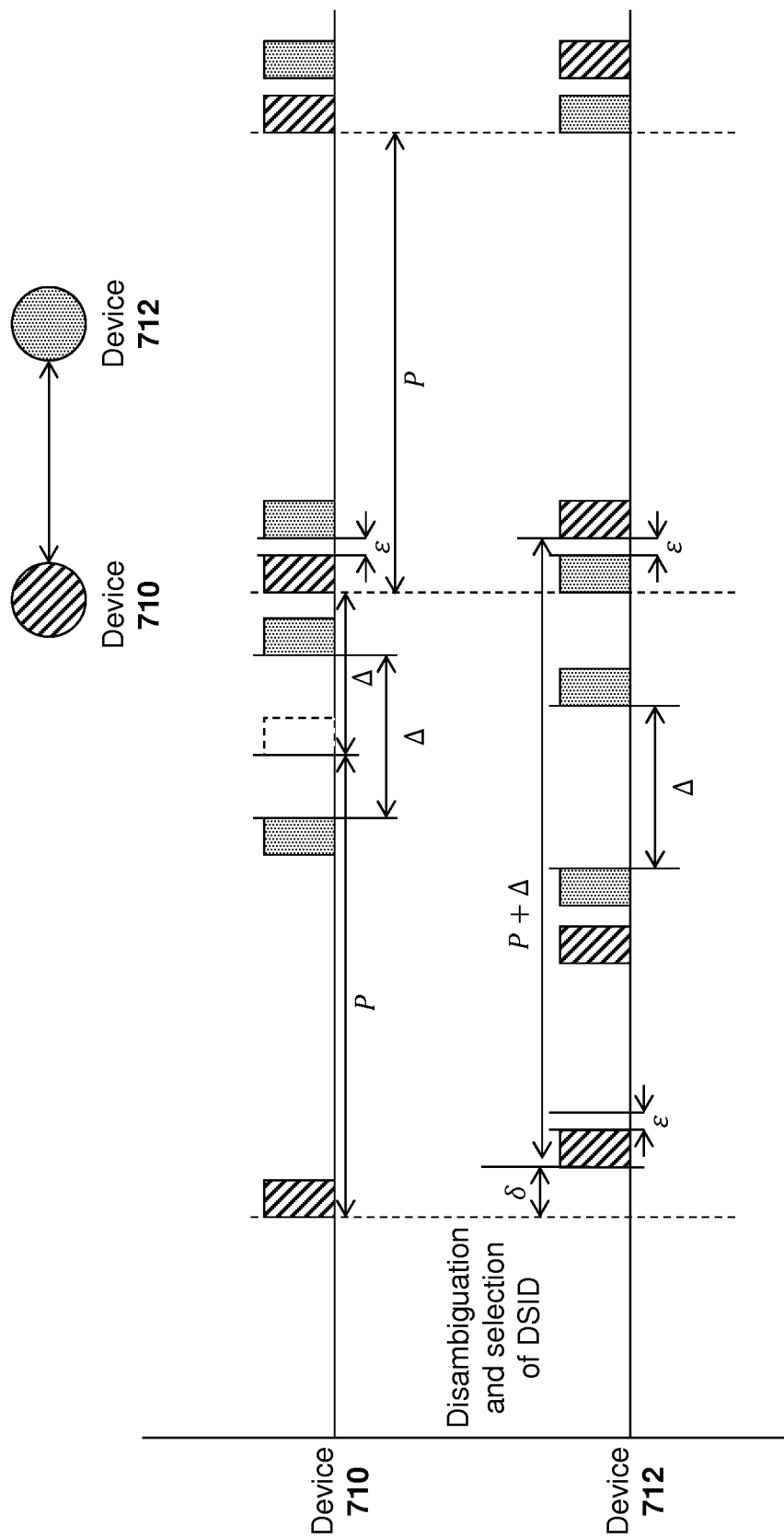
FIG. 7 is block diagram showing signal timing adjustment between devices.

Reference is now made to FIG. 7 which shows a new device 710 that has requested to join a network, and has device 712 as its neighbor, adjusts its timing. The example assumes that device 710 has determined the signal period P, and the half-duplex Tx to Rx transition time within a device is $\epsilon$. The example also assumes that the path propagation delay between devices 710 and 712 is $\delta$.

After the disambiguation procedure described above, the device 710 picks its unambiguous DSID and transmits it with tentative timing. In some embodiments this timing is based on the received signal timing from device 712.

Device 712, which is in the network and had suspended its DS signal to provide resources to the network join procedure, is able to receive this signal from device 710. Device 712 then computes the correction that device 710 needs in order to apply $P+\Delta$, such that the corrected signal from device 710 is received by device 712 after the device's periodic DS transmission and the transmission to receive switch time.

In the present embodiment, the correction is sent using two consecutive DS transmissions spaced $\Delta$ time units apart.

Upon receiving these DSs, device 710 is able to compute the time of its next and subsequent periodic DS transmission such that device 712 is able to receive them. In some embodiments, the time correction is indicated by the DS transmission from the network devices by using the DS transmissions with the DSID of the new device. In other embodiments, the time correction and the DSID, for which the timing correction is meant is indicated in the DSB.

By sending the timing of the subsequent DSs using the $\Delta$, the network device 712 receives and measures the correction required $P+\Delta$.

When sending possible corrections to new devices, a network device may provide opportunities where it is already receiving DSs of other devices in the neighbor set. This may include the indication of the time after which the network device is not receiving from any current neighbor and therefore may receive from the new device if the existing opportunities do not suffice. The simultaneous reception of DSs is possible since the DSs of neighbors are distinguishable from each other due to distinct DSIDs. Such coincident reception of DSs allows devices to operate with a lower SP and therefore offer less latency in the system.

Figure 8:
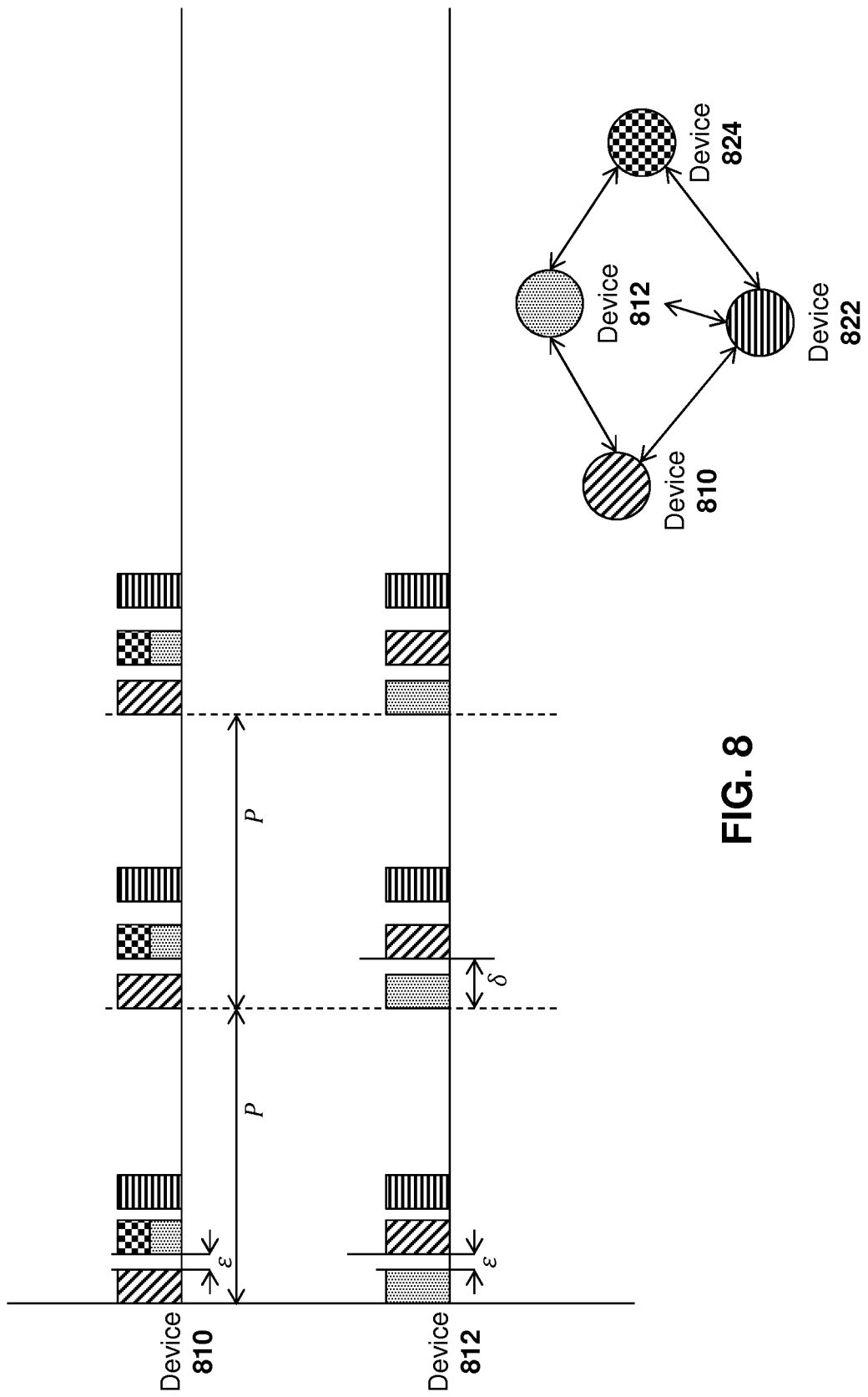
FIG. 8 is a block diagram showing signaling of a plurality of device signals in a time slot.

For example, reference is now made to FIG. 8 which shows how after two other devices join the devices 810 and 812. From the previous examples, the DSs from the other two devices may coincide in time. In particular, device 810 can see device 822 and device 812 can see devices 822 and device 824. Thus, in a single time slot device 812 may receive from device 810 or device 822.

Once the timing for the DSs between each neighbor is established as described above, the devices can continue to monitor the receiving timing of DSs and send or receive subsequent corrections when needed. In some embodiments, the corrections may allow devices to coincide reception of previously separately received DSs or vice versa. Thus, the DSs are essentially a broadcast signal.

Given the timing of DSs established and maintained between neighbors, the neighbors can reference the respective DSs sent by neighbors to receive resources consistently in the time domain. These resources can be used for the transmission of data blocks or for further signaling.

Using the mechanism above a system is able to coordinate the timing of the control signals such as DSs as well as data transmissions without requiring a uniform system wide timing source.

Once the network is established, data may be transferred between devices in a contention free manner using the DSs, and in particular, using the DSB to reserve resources for such data transfer.

The above may be implemented by any UEs. One exemplary device is described below with regard to FIG. 9.

UE 900 is typically a two-way wireless communication device having voice and data communication capabilities. UE 900 may have the capability to communicate with other UEs and in some instance to networks. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 900 is enabled for two-way communication, it may incorporate a communication subsystem 911, including both a receiver 912 and a transmitter 914, as well as associated components such as one or more antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication system in which the device is intended to operate. The radio frequency front end of communication subsystem 911 can be used for any of the embodiments described above.

If enabled for network connection as well as D2D connection, UE 900 may have network access requirements that will vary depending upon the type of network. In some networks network access is associated with a subscriber or user of UE 900. A UE may require a removable user identity module (RUIM) or a subscriber identity module (SIM) card in order to operate on a CDMA network. The SIM/RUIM interface 944 is normally similar to a card-slot into which a SIM/RUIM card can be inserted and ejected. The SIM/RUIM card can have memory and hold many key configurations 951, and other information 953 such as identification, and subscriber related information.

When required network registration or activation procedures, if any have been completed, UE 900 may send and receive communication signals over the network. Otherwise, network registration can occur in accordance with the embodiments above for a D2D network.

Signals received by antenna 916 are input to receiver 912, which may perform such common receiver functions as signal amplification, frequency down conversion, filtering, channel selection and the like. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analogue conversion, frequency up conversion, filtering, amplification and transmission via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

UE 900 generally includes a processor 938 which controls the overall operation of the device. Communication functions, including data and voice communications, are performed through communication subsystem 911. Processor 938 also interacts with further device subsystems such as the display 922, flash memory 924, random access memory (RAM) 926, auxiliary input/output (I/O) subsystems 928, serial port 930, one or more keyboards or keypads 932, speaker 934, microphone 936, other communication subsystem 940 such as a short-range communications subsystem and any other device subsystems generally designated as 942. Serial port 930 could include a USB port or other port known to those in the art.

Figure 9:
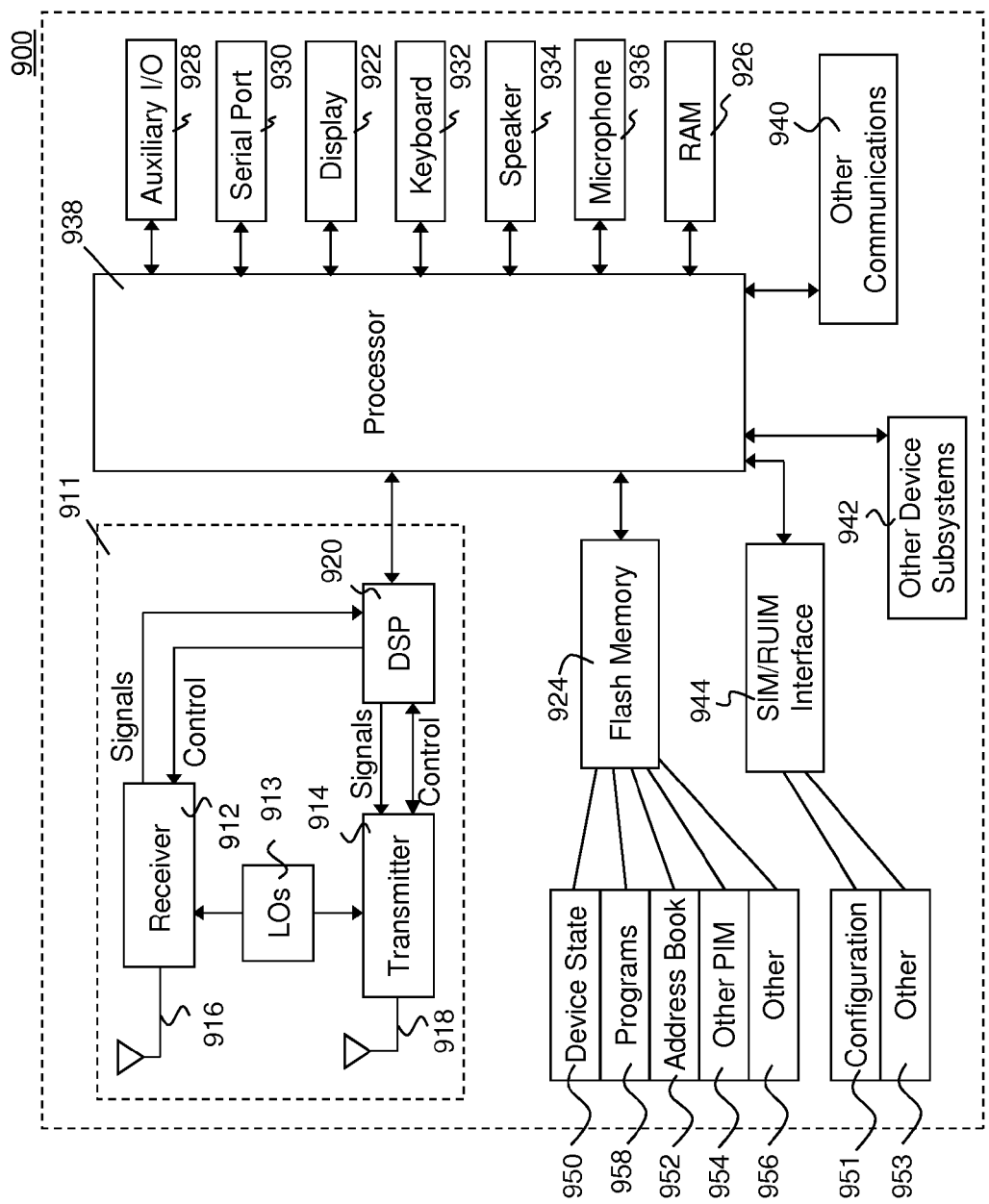
FIG. 9 is a block diagram of a user equipment capable of being used with the embodiments of the present disclosure.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the processor 938 may be stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Processor 938, in addition to its operating system functions, may enable execution of software applications on the UE. A predetermined set of applications that control basic operations, including at least data and voice communication applications for example, will normally be installed on UE 900 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items. Further applications may also be loaded onto the UE 900, for example through an auxiliary I/O subsystem 928, serial port 930, short-range communications subsystem 940 or any other suitable subsystem 942, and installed by a user in the RAM 926 or a non-volatile store (not shown) for execution by the processor 938. Such flexibility in application installation increases the functionality of the device and may provide enhanced on-device functions, communication-related functions, or both.

In a data communication mode, a received signal such as a text message or web page download will be processed by the communication subsystem 911 and input to the processor 938, which may further process the received signal for output to the display 922, or alternatively to an auxiliary I/O device 928.

A user of UE 900 may also compose data items such as email messages for example, using the keyboard 932, which may be a complete alphanumeric keyboard or telephone-type keypad, among others, in conjunction with the display 922 and possibly an auxiliary I/O device 928. Such composed items may then be transmitted over a communication network through the communication subsystem 911.

For voice communications, overall operation of UE 900 is similar, except that received signals would typically be output to a speaker 934 and signals for transmission would be generated by a microphone 936. Alternative voice or audio I/O subsystems, such as a voice message recording subsystem, may also be implemented on UE 900. Although voice or audio signal output is generally accomplished primarily through the speaker 934, display 922 may also be used to provide an indication of the identity of a calling party, the duration of a voice call, or other voice call related information for example.

Serial port 930 in FIG. 9 would normally be implemented in a personal digital assistant (PDA)-type UE for which synchronization with a user's desktop computer (not shown) may be desirable, but is an optional device component. Such a port 930 would enable a user to set preferences through an external device or software application and would extend the capabilities of UE 900 by providing for information or software downloads to UE 900 other than through a wireless communication network. The alternate download path may for example be used to load an encryption key onto the device through a direct and thus reliable and trusted connection to thereby enable secure device communication. As will be appreciated by those skilled in the art, serial port 930 can further be used to connect the UE to a computer to act as a modem.

Other communications subsystems 940, such as a short-range communications subsystem, is a further optional component which may provide for communication between UE 900 and different systems or devices, which need not necessarily be similar devices. For example, the subsystem 940 may include an infrared device and associated circuits and components or a Bluetooth™ communication module to provide for communication with similarly enabled systems and devices. Subsystem 940 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a first user equipment operating in or near a wireless network without a central controller, the method comprising:
   receiving one or more device signals from corresponding one or more second user equipments; and
   utilizing the received one or more device signals to unambiguously identify devices that may contend for radio resources in a contention region to determine a contention free transmission opportunity at the first user equipment and utilizing the received device signals to compute time and radio resources used to send a new device signal to all user equipments in the contention region of the first user equipment.

2. The method of claim 1, wherein the new device signal does not interfere with the device signal from the second user equipment.

3. The method of claim 1, further comprising:
   receiving, by the first user equipment, a device signal and unique identifier from each user equipment that is part of the network in the contention region; and
   determining that a device signal is ambiguous if the device signal is associated with more than one unique identifier.

4. The method of claim 3, further comprising:
   transmitting from the first user equipment each device signal determined ambiguous and associated unique identifiers to all user equipments in the contention region.

5. The method of claim 4, wherein the transmitting is performed multiple times at random time intervals using radio resources reserved for disambiguation.

6. The method of claim 4, further comprising:
   determining that a device signal is ambiguous if the first user equipment receives, multiple unique identifiers from among user equipments that are not part of the network in the contention region;
   if ambiguity is determined, further determining an ordering of the user equipments that are not part of the network in the contention region based on respective unique identifiers.

7. The method of claim 6, further comprising:
   determining a set of device signals not used by another user equipment within a predetermined number of hops from the first user equipment;
   determining if the first user equipment should resolve the ambiguity utilizing an ordering of the unique identifiers received; and
   if the first user equipment should resolve the ambiguity, choosing a device signal not being used within the predetermined number of hops.

8. The method of claim 3, further comprising:
   determining a set of device signals not used by another user equipment within a predetermined number of hops from the first user equipment;
   selecting, by the first user equipment, a device signal not being used within the predetermined number of hops.

9. The method of claim 1, wherein the new device signal is ambiguously transmitted with regard to other new devices in a contention area.

10. The method of claim 9, further comprising:
    removing ambiguity based on other new devices;
    choosing a device signal for the first user equipment; and
    transmitting the device signal to user equipments in the contention region.

11. The method of claim 10, wherein the removing ambiguity based on other new devices comprises:
    transmitting, from the first user equipment, a disambiguation device signal containing a unique identifier of the first user equipment to all user equipments in the contention region that are part of any network.

12. The method of claim 11, wherein resources for the disambiguation device signal are reserved and signaled by user equipments in the contention region.

13. The method of claim 11, wherein the transmitting is performed multiple times at random time intervals during radio resources reserved for disambiguation.

14. The method of claim 1, wherein the first user equipment uses the received device signals to determine a set of user equipments that are in the contention region and part of the network.

15. The method of claim 1, wherein the device signal comprises a signaling block.

16. The method of claim 15, wherein the signaling block provides means for the assignment of resources for contention free communications in the network.

17. The method of claim 1, wherein the device signal is received periodically.

18. The method of claim 1, further comprising the first user equipment that is part of a network transmitting signaling to a user equipment in the contention region that is part of a network to adjust timing of the device signal transmission.

19. The method of claim 18, wherein transmitting comprises two device signals with a delta timing difference, wherein the delta timing difference is used to adjust timing of the device signal.

20. The method of claim 18, wherein signaling comprises of a plurality of time slots.

21. The method of claim 20, wherein the timing adjustment allows receipt of more than one device signal in a time slot.

22. The method of claim 1, wherein the timing of at least one transmission of a device signal from a user equipment that is part of a network is used by the first device as a timing reference for further signaling or communication.

23. The method of claim 1, further comprising:
receiving, at the first user equipment, a new device signal from a third user equipment; and
providing a disambiguation signal to the third user equipment.

24. The method of claim 23, wherein the disambiguation signal contains a unique identifier for the first user equipment.

25. The method of claim 1, further comprising:
receiving a device signal and a unique identifier from each user equipment within the contention region that is not part of the network; and
detecting an ambiguity if more than one unique identifier is received.

26. The method of claim 25, further comprising:
transmitting device signals determined ambiguous and associated unique identifiers to all user equipments in the contention region.

27. The method of claim 1, further comprising:
if the first user equipment is part of the network, determining a device signal ambiguity if the first user equipment utilizes a device signal that conflicts with the signal used by another device within a predetermined number of hops;
determining if the first user equipment should resolve the ambiguity utilizing the unique user equipment identifiers received; and
if the first user equipment should resolve the ambiguity, utilizing a device signal not being used within the predetermined number of hops.

28. A first user equipment operating in or near a wireless network without a central controller, the first user equipment comprising:
a processor; and
a communications subsystem, wherein the first user equipment is configured to:
receive one or more device signals from one or more second user equipments; and
utilize the received one or more device signals to unambiguously identify devices that may contend for radio resources in a contention region to determine a contention free transmission opportunity at the first user equipment and utilize the received device signals to compute time and radio resources used to send a new device signal to all user equipments in the contention region of the first user equipment.

* * * * *